(12) United States Patent
Lukehart et al.

(10) Patent No.: US 8,318,128 B2
(45) Date of Patent: Nov. 27, 2012

(54) METHOD OF PREPARING VANADIUM OXIDE NANOPARTICLES

(75) Inventors: Charles Lukehart, Nashville, TN (US); Lisa Marie Sullivan, New Johnsonville, TN (US); Lang Li, Nashville, TN (US); William H Morris, III, Nashville, TN (US)

(73) Assignee: Vanderbilt University, Nashville, TN (US)

( * ) Notice: Subject to any disclaimer, the term of this patent is extended or adjusted under 35 U.S.C. 154(b) by 40 days.

(21) Appl. No.: 12/223,108

(22) PCT Filed: Jan. 18, 2007

(86) PCT No.: PCT/US2007/060668
§ 371 (c)(1),
(2), (4) Date: Dec. 20, 2010

(87) PCT Pub. No.: WO2008/011198
PCT Pub. Date: Jan. 24, 2008

(65) Prior Publication Data
US 2011/0085964 A1    Apr. 14, 2011

(51) Int. Cl.
*C01B 13/00* (2006.01)
(52) U.S. Cl. ............... 423/594.17; 423/65; 977/775
(58) Field of Classification Search ............ 423/594.17, 423/65–67; 977/775
See application file for complete search history.

(56) References Cited

U.S. PATENT DOCUMENTS

| | | | |
|---|---|---|---|
| 5,112,676 A * | 5/1992 | Cot et al. ............... | 427/226 |
| 6,074,979 A * | 6/2000 | Hagemeyer et al. ....... | 502/159 |
| 6,413,489 B1 * | 7/2002 | Ying et al. ............... | 423/600 |
| 6,749,966 B2 * | 6/2004 | Reitz et al. .............. | 429/231.2 |
| 6,838,486 B2 | 1/2005 | Ryang | |

OTHER PUBLICATIONS

International Search Report from PCT/US2007/060668.

* cited by examiner

*Primary Examiner* — Steven Bos
(74) *Attorney, Agent, or Firm* — John Bruckner PC

(57) ABSTRACT

Vanadium oxide nanoparticles prepared by an inverse micelle hydrolysis of vanadium alkoxide in the presence of a basic catalyst.

4 Claims, No Drawings

METHOD OF PREPARING VANADIUM OXIDE NANOPARTICLES

FIELD OF THE INVENTION

The present invention relates to nanoparticulate vanadium dioxide useful for its semiconductor-to-metal phase transition properties. The entire contents and disclosures of each and every reference and patent cited below are incorporated herein by reference. Research leading to the present invention was partially funded by a grant from the National Science Foundation (No. DMR-0210785).

BACKGROUND OF THE INVENTION

In 1959 a semiconductor-to-metal phase transition temperature for vanadium dioxide ($VO_2$) of 340 K was reported. Below 340 K, $VO_2$ is a semiconductor with monoclinic unit cell symmetry. At temperatures above 340 K, $VO_2$ becomes metallic and adopts tetragonal unit cell symmetry. With this phase transition $VO_2$ experiences many drastic changes, such as a rapid decrease in optical transmittance in the near-IR and an increase in resistivity of ca. five orders of magnitude. These properties allow the use of $VO_2$ in a wide range of applications, including thermochromic materials, electrical switches, optical storage, self-protecting support windows, erasable optical data recording, thermal sensors, coatings for energy-efficient windows and thermal sensors and relays.

Indeed, $VO_2$ is one of several transition metal oxides which show an abrupt change in certain physical properties such as electrical resistance at a temperature $T_t$ (transition temperature). In $VO_2$, the transition is probably best described as a first-order semiconductor-to-metal transition accompanied by a lattice distortion with $T_t=68°$ C. Because of this conveniently low transition temperature and the large drop in near infrared transmittance, films of $VO_2$ have been used in a variety of applications as noted above.

Substances like $VO_2$ in which both sensing and actuating capabilities are coupled by an intrinsic control mechanism are sometimes referred to as "smart" materials. The above-described phase transition of $VO_2$ is accompanied by extraordinary changes in its electronic and optical properties. When a $VO_2$ film is coated onto a transparent substrate, and illuminated so that the film absorbs sufficiently intense laser light, the resulting temperature increase can induce a rapid semiconducting-to-metal phase transformation. The presence of the metallic $VO_2$ phase then produces a reflecting surface, that subsequently strongly attenuates further transmission of the incident laser radiation through the coated substrate. Accordingly, the $VO_2$ film performs both sensing and actuating functions through coupled intrinsic properties of the material.

For investigation of the semiconductor-to-metal phase transition, $VO_2$ has been prepared as thin films. The following methods have been reported for the preparation of thin films of $VO_2$; sol-gel processing of V(V) precursors [Livage, J. Optical and Electrical Properties of Vanadium Oxides Synthesized from Alkoxides. Coord. Chem. Rev. 1999, 190-192, 391-403; Speck, K. R.; Hu, H. S.-W.; Sherwin, M. E.; Potember, R. S. Vanadium Dioxide Films Grown from Vanadium Tetraisopropoxide by the Sol-Gel Process. Thin Solid Films 1988, 165, 317-322; Dachuan, Y.; Niankan, X.; Jingyu, Z.; Xiulin, Z. Vanadium Dioxide Films with Good Electrical Switching Properties. J. Phys. D: Appl. Phys. 1996, 29, 1051-1057; Livage, J.; Guzman, G.; Beteille, F.; Davidson, P. Optical Properties of Sol-Gel Derived vanadium Oxide Films. J. Sol-Gel Sci. Technol. 1997, 8, 857-865; Partlow, D. P.; Gurkovich, S. R.; Radford, K. C.; Denes, L. J. Switchable Vanadium Oxide Films by a Sol-Gel Process. J. Appl. Phys. 1991, 70 (1), 443-452]; chemical vapor deposition of $VO(OiPr)_3$ [Sahana, M. B.; Subbanna, G. N.; Shivashankar, S. A. Phase Transformation and Semiconductor-Metal Transition in Thin Films of $VO_2$ Deposited by Low-pressure Metalorganic Chemical Vapor Deposition. J. Appl. Phys. 2002, 92 (11), 6495-6504; Greenberg, C. B. Undoped and Doped $VO_2$ Films Grown from $VO(OC3H7)_3$ Thin Solid Films 1983, 110, 73-82; Golubev, V. G.; Davydov, V. Y.; Kartenko, N. F.; Kurdyukov, D. A.; Medvedev, A. V.; Pevtsov, A. B.; Scherbakov, A. V.; Shadrin, E. B. Phase Transition-Governed Opal-$VO_2$ Photonic Crystal. Appl. Phys. Lett. 2001, 79 (14), 2127-2129]; radio-frequency sputtering using vanadium metal, $V_2O_3$, and $V_2O_5$ as targets [Wang, X.; Xu, J.; Fei, Y.; Li, D.; Li, T.; Nie, Y.; Feng, K.; Wu, N. Preparation of Thermochromic $VO_2$ Thin Films on Fused Silica and Soda lime Glass by R F Magnetron Sputtering. Jpn. J. Appl. Phys. 2002, 41, 312-313.; Shigesato, Y.; Enomoto, M.; Odaka, H. Thermochromic $VO_2$ Films Deposited by RF Magnetron Sputtering Using $V_2O_3$ or $V_2O_5$ Targets. Jpn. J. Appl. Phys. 2000, 39, 6016-6024. Hanlon, T. J.; Walker, R. E.; Coath, J. A.; Richardson, M. A. Comparison Between Vanadium Dioxide Coating on Glass Produced by Sputtering, Alkoxide, and Aqueous Sol-Gel Methods. Thin Solid Films 2002, 405, 234237]; ion-beam enhanced deposition (IBED) from $V_2O_5$ powder [Ninhyi, Y.; Jinhua, L.; Chan, H. L. W.; Chenglu, L. Comparison of $VO_2$ Thin Films Prepared by Inorganic Sol-Gel and IBED Methods. Appl. Phys. A 2004, 78, 777-780; Li, J.; Yuan, N. Temperature Sensitivity of Resistance of $VO_2$ Polycrystalline Films Formed by Modified Ion Beam Enhanced Deposition. Appl. Surf. Sci. 2004, 233, 252-257]; pulsed laser deposition (PLD) using a vanadium metal Target [(Suh, J. Y.; Lopez, R; Feldman, L. C.; Haglund, R F., Jr. Semiconductor to Metal Phase Transition in the Nucleation and Growth of $VO_2$ Nanoparticles and Thin Films. J. Appl. Phys. 2004, 96 (2), 1209-1213; Lopez, R; Feldman, L. C.; Haglund, R F., Jr. Size-Dependent Optical Properties of $VO_2$ Nanoparticle Arrays. Phys. Rev. Lett. 2004, 93 (17), 177403-1/177403-4; Soltani, M.; Chaker, M.; Haddad, E.; Kruzelecky, R. V.; Nikanpour, D. Optical Switching of Vanadium Dioxide Films Deposited by Reactive Pulsed Laser Deposition. J. Vac. Sci. Technol. A 2004, 22 (3), 859-864; Liu, H.; Vasquez, O.; Santiago, V. R.; Diaz, L.; Fernandez, F. E. Excited State Dynamics and Semiconductor-to-Metallic Phase Transition of $VO_2$ Thin Film. J. Lumin. 2004, 108, 233-238] and ion implantation of vanadium and oxygen ions into a $SiO_2$ substrate [Lopez, R; Haynes, T. E.; Boatner, L. A.; Feldman, L. C.; Haglund, R. F., Jr. Size Effects in the Structural Phase Transitions of $VO_2$ Nanoparticles. Phys. Rev. B 2002, 65, 224113; Lopez, R.; Haynes, T. E.; Boatner, L. A.; Feldman, L. C.; Haglund, R. F., Jr. Temperature-Controlled Surface Plasmon Resonance in $VO_2$ Nanorods. Opt. Lett. 2002, 27(15), 1327-1329; Lopez, R.; Boatner, L. A.; Haynes, T. E.; Haglund, R. F., Jr.; Feldman, L. C. Enhanced hysteresis in the semiconductor-to-metal phase transition of $VO_2$ precipitates formed in $SiO_2$ by ion implantation. Appl. Phys. Lett. 2001, 79 (19), 3161-3163; Lopez, R.; Boatner, L. A.; Haynes, T. E.; Feldman, L. C.; Haglund, R. F., Jr. Synthesis and characterization of size-controlled vanadium dioxide nanocrystals in a fused silica matrix. J. Appl. Phys. 2002, 92 (7), 40314036; Lopez, R.; Boatner, L. A.; Haynes, T. E.; Haglund, R. F., Jr.; Feldman, L. C. Switchable Reflectivity on Silicon from a Composite $VO_2$-$SiO_2$ Protecting Layer. Appl. Phys. Lett. 2004, 85 (8), 1410-1412; Lopez, R.; Suh, J. Y.; Feldman, L. C.; Haglund, R. F., Jr. Ion Beam Lithographic Fabrication of Ordered $VO_2$ Nanoparticle Arrays. Mater. Res. Soc. Syrnp. Proc. 2004, 820, 319-324].

Since vanadium (IV) oxide is a metastable oxide between the very stable vanadium (V) and (III) oxides, thermal treatment of as-prepared samples is important for the preparation of vanadium (IV) oxide ($VO_2$). The following thermal treatments are reported for the preparation of $VO_2$ thin films; (1) heating of V(V) sol-gel precursor films at 400-700° C. in $N_2(g)$ (via thermal elimination of $O_2$), supra; at 500° C. in 5% $H_2$/95% Ar(g) [Soltani, M.; Chaker, M.; Haddad, E.; Kruzelecky, R. V.; Nikanpour, D. Optical Switching of Vanadium Dioxide Films Deposited by Reactive Pulsed Laser Deposition. *J. Vac. Sci. Technol. A* 2004, 22 (3), 859-864; Liu, H.; Vasquez, O.; Santiago, V. R.; Diaz, L.; Fernandez, F. E. Excited State Dynamics and Semiconductor-to-Metallic Phase Transition of $VO_2$ Thin Film. *J. Lumin.* 2004, 108, 233-238]; at 300-500° C. in $H_2(g)$ [Dachuan, U.; Niankan, X.; Jingyu, Z.; Xiulin, Z. High Quality Vanadium Dioxide Films Prepared by an Inorganic Sol-Gel Method. *Mater. Res. Bull.* 1996, 31 (3), 335-340] and at 500° C. and 5 Pa in a vacuum oven, supra (2) reactive decomposition of CVD precursors at 500-550° C. in $N_2(g)$ flow [Greenberg, C. B. Undoped and Doped $VO_2$ Films Grown from $VO(OC_5H7h$ *Thin Solid Films* 1983, 110, 73-82]; (3) heating of IBED $V_2O_5$ samples in Ar(g) at 500-600° C., [supra and Lee, M.-H.; Cho, J.-S. Better Thermochromic Glazing of Windows with Anti-Reflection Coating. *Thin Solid Films* 2000, 365, 5-6] and (4) heating VxOylSi PLD precursors at 450° C. and 250 mTorr $O_2$ pressure to give $VO_2$/Si, supra.

Micelles and inverse micelles are microscopic vesicles that contain amphipathic molecules but do not contain an aqueous volume that is entirely enclosed by a membrane. In micelles the hydrophilic part of the amphipathic compound is on the outside (on the surface of the vesicle) whereas in inverse micelles the hydrophobic part of the amphipathic compound is on the outside. The inverse micelles thus contain a polar core that can solubilize both water and macromolecules within the inverse micelle. As the volume of the core aqueous pool increases the aqueous environment begins to match the physical and chemical characteristics of bulk water. See U.S. Pat. No. 6,673,612. The resulting inverse micelle can be referred to as a microemulsion of water in oil (Schelly, Z. A. Current Opinion in Colloid and Interface Science, 37-41, 1997; Castro, M. J. M., Cabral, J. M. S. Biotech. Adv. 6, 151-167, 1988).

Sol-gel processing can be used to prepare a variety of materials including unsupported powders, fibers, xerogel and aerogel composites, and dense glasses or ceramics. Sol-gel processing consists of a combination of hydrolysis and polycondensation reactions of a metal alkoxide, $M(OR)_x$, resulting in the formation of a sol (a suspension of colloidal particulate materials in a liquid media) and a gel (a porous three-dimensional solidified framework surrounded by a sustaining liquid phase). In sol-gel processing, the particle size and morphology of the product material are determined by catalyst concentration, water concentration, and relative rates of hydrolysis and condensation. The type of catalyst, acidic or basic, also affects the properties of the product formed.

The use of an acid catalyst causes products to elongate in a chain-like fashion forming a porous gel. The formation of a branching metal center occurs with the use of a base catalyst leading to the formation of a more dense gel. The size of the R group of the metal alkoxide reactant also affects the rates of hydrolysis and condensation. A larger R group sterically shields a metal center and reduces the rates of hydrolysis and condensation reactions. Silicon alkoxides are the most common alkoxides used in sol-gel processing because they have convenient rates of hydrolysis and condensation. Transition metal alkoxides tend to undergo hydrolysis and condensation at extremely rapid rates due to high electrophilicity and possible coordination number expansion of the metal center. R-group exchange of transition metal alkoxides is frequently performed to decrease their reaction rates. Transition metal methoxides and ethoxides are frequently reacted with acetylacetonate (acac) to form the corresponding $M(acac)_x$ complex with decreased rates of hydrolysis and condensation. Often R groups are exchanged in parent alcohols with larger R groups than the alkoxide to reduce the reaction rates of the alkoxide.

Inverse micelle reactions are commonly used for the shape-directed synthesis of nanoparticles [Landfester, K. Recent Developments in Miniemulsions—Formation and Stability Mechanisms. *Macromol. Symp.* 2000, 150, 171-178; Chang, C.-L.; Fogler, H. S. Controlled Formation of Silica Particles from Tetraethyl Orthosilicate in Nonionic Water-in-Oil Microemulsions. *Langmuir* 1997, 13, 3295-3307; Landfester, K. The Generation of Nanoparticles in Miniemulsions. *Adv. Mater.* 2001, 13 (10), 765-768; Arriagada, F. J.; Osseo-Asare, K. Controlled hydrolysis of tetraethyoxysilane in a nonionic water-in-oil microemulsion: a statistical model of silica nucleation. *Colloids Surf. A* 1999, 154, 311-326; Arriagada, F. J.; Osseo-Asare, K. Phase and dispersion stability effects in the synthesis of silica nanoparticles in a non-ionic reverse microemulsion. *Colloids Surf. A* 1992, 69, 105-115; Arriagada, F. J.; Osseo-Asare, K. Synthesis of Nanosize Silica in a Nonionic Water-in-Oil Microemulsion: Effects of the Water/Surfactant Molar Ratio and Ammonia Concentration. *J. Colloid Interface Sci.* 1999, 211, 210-220].

An inverse micelle reaction medium generally consists of an oil or organic phase, a surfactant system, and aqueous reagents. Cyclohexane and the like may be used as the oil/organic phase, and hexanol may be used as a co-surfactant. Triton N-101 and Igepal® CO-630 are commonly used as surfactants. The latter are polyoxyethylenenonylphenyl ether reagents that form spherical inverse micelles that act as vesicles in which the aqueous reagents react. To initiate the formation of these vesicles, aqueous ammonia is often used as a base catalyst. This inverse micelle system allows for the formation of nanoparticulate powders with a narrow size distribution. The size of the product powders is determined by controlling the size of the inverse micelles formed. As the water-to-surfactant molar ratio increases, the micelle size decreases, giving smaller particles and narrower size distribution of the resulting particles.

Polydispersity and particle agglomeration are the most common problems associated with uncontrolled hydrolysis and condensation. With inverse micelle systems, reactions are confined to small aqueous vesicles allowing for better control of hydrolysis and condensation reaction rates. Therefore, by choosing the appropriate sol-gel reagents and inverse micelle water to surfactant ratio, the formation of monodispersed particles is available from the combination of sol-gel processing and inverse micelle synthesis methods.

A variety of methods have been reported for the preparation of nanocrystals. These methods include inverse micelle preparations, arrested precipitation, aerosol processes, and sol-gel processes (see U.S. Pat. No. 6,682,596).

The recent discovery of a particle size-dependence on the phase transition temperature of $VO_2$ for particles of 70-180 nm average diameter has been reported. Nanoparticulate $VO_2$/Si($SiO_2$) samples for these studies were prepared using two different syntheses strategies; (1) ion implantation of vanadium and oxygen ions in a $SiO_2$ substrate with subsequent annealing at 1000° C. in flowing high-purity Ar(g) and (2) pulsed laser deposition of V on a Si substrate using a vanadium metal target at 5 mTorr $O_2$ pressure and subsequent thermal treatment at 450° C. and 250 mTorr O₂ pressure. Other methods for the production of VO₂ are disclosed in U.S. Pat. Nos. 5,885,665; 5,608,568; 4,957,725; 4,654,231.

It is an object of the invention to provide novel vanadium dioxide nanoparticles and methods for the preparation thereof.

SUMMARY OF THE INVENTION

The above and other objects are realized by the present invention, one embodiment of which relates to vanadium dioxide nanoparticles.

Another embodiment of the invention concerns a method for preparing VO₂ nanoparticles comprising the inverse micelle hydrolysis of (1) a compound having the formula:

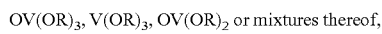

OV(OR)₃, V(OR)₃, OV(OR)₂ or mixtures thereof, wherein: R is H or an organic group capable of forming ROH during the inverse micelle reaction, or
(2) the reaction product or premix of (1) with an acid (such as a carboxylic acid, e.g., acetic or oleic acid or other organic acids, Bronsted acids, e.g., beta-diketones or Schiff bases), wherein the conditions of the reaction are such that the hydrolysis and condensation rates of the compound are minimized sufficiently to at least inhibit premature precipitation and excess reduction of the VO₂ particles produced by the reaction.

A still further embodiment of the invention comprises a method for preparing VO₂ nanop-articles comprising reacting a vanadyl ester having the formula VO(OR)₃ (wherein R is an alkyl, preferably a lower alkyl, group) with a carboxylic acid in an aqueous medium, followed by precipitation therefrom of nanosize VO₂ particles

DETAILED DESCRIPTION OF THE INVENTION

As noted above, previous studies have generated considerable interest in developing chemical methods for the preparation of unsupported VO₂ nanoparticles. Chemical synthesis strategies might afford VO₂ nanoparticles having smaller sizes than those achieved by more physical methods and without the presence of a passivating matrix. By confining the sol-gel reaction of vanadyl reagents to aqueous regions within inverse micelles, vanadium oxide nanoparticles of controlled size can be prepared according to the present invention. Three processing modes are described herein for the preparation of VO₂ nanoparticles using inverse micelle syntheses (wherein iPr=isopropyl):

Processing Mode 1—inverse micelle hydrolysis of VO(O-iPr)₃ with varying concentrations of base catalyst and subsequent thermal treatment in Ar(g).

Processing Mode 2—inverse micelle hydrolysis of a VO(OiPr)3/oleic acid premix using varying concentrations of base catalyst and subsequent thermal treatment in H₂(g).

Processing Mode 3—inverse micelle hydrolysis of a VO(OiPr)3/acetic acid premix and subsequent thermal treatment in 10% H₂/90% N₂(g).

Processing Mode 1 results in the preparation of V$_x$O$_y$/VO₂ nanocomposites with agglomerated particles having a wide size distribution. The product is a mixed phase vanadium oxide with V₂O₅ and V₂O₃ being dominant phases, and VO₂ present only in small amounts in the sample. Processing Mode 2 results in the preparation of VO₂ nanoparticles with agglomerated particles having a wide size distribution. Modifications of the VO(OiPr)₃ precursor and thermal treatment lead to the preparation of VO₂ samples with negligible mixed-phase contamination. Processing Mode 3 results in the preparation of monodispersed, spheroidal-shaped VO₂ nanoparticles. Modifications of the VO(OiPr)₃ premix precursor and thermal treatment reduced particle agglomeration giving monodispersity of particles formed. Details of each synthetic processing mode are described in the examples below.

It will be understood by those skilled in the art that "nanoparticle" refers to a particle having a size in the general range of 1-100 nm.

It will further be understood by those skilled in the art that "inverse micelle reaction" refers to the well known reaction defined, for example in U.S. Pat. No. 6,682,596 and www.uaf.edu/chem/467Sp05/manuals.pdf.

Reagents: The following chemical reagents were obtained from Fisher Chemicals, Fairlawn, N.J., glacial acetic acid, cyclohexane, and distilled water. The chemical reagents n-hexanol and Igepal® CO-630 were obtained from Sigma-Aldrich Co., Milwaukee, Wis. Vanadyl isopropoxide VO(O-iPr)₃ was obtained from Strem Chemicals, Inc., Newburyport, Mass. Ethanol (absolute, 200 proof) was obtained from AAPER Alcohol and Chemical Co., Shelbyville, Ky. Oleic acid (97%) was obtained from Acros Organic/Fisher Scientific International, Inc., USA.

X-ray diffraction (XRD) scans were obtained using a Scintag XI B/B automated powder X-ray diffractometer with a Cu target, a Peltier-cooled solid-state detector, and zero-background, Si(51O) sample support. Scans at elevated temperature were recorded using a Buehler high-temperature attachment.

Samples for transmission electron microscopy (TEM) imaging were prepared by placing a drop of a ceramic/acetone suspension onto a holey carbon-coated, copper grid followed by evaporation of the acetone. Average particle size was determined by manually measuring over 100 particles from bright-field micrographs recorded on a Philips CM20T TEM operating at 200 kV.

Thermal treatments were conducted inside a quartz tube under continuous air flow using a one-foot Lindberg/Blue tube furnace. The temperature was ramped at 20°/1 min to 600° C. and held for 10 h. Bulk elemental analyses were performed by Atlantic Microlab, Inc., Norcross, Ga.

Example 1

Processing Mode 1—Preparation of V$_x$O$_y$ nanoparticles by the Inverse Micelle Reaction of VO(OiPr)₃ using $2.5 \times 10^{-3}$ mol NH₃(aq) catalyst [NH₃:V mole ratio=0.3]. An inverse micelle reaction solution was prepared by adding the following reagents to a 100 mL round-bottom flask with stirring: 30.0 mL (0.28 mol) cyclohexane, 1.2 mL (9.56 mmol) n-hexanol, 3.8 mL (5.92 mmol) Igepal® C0630, 1.4 mL (0.08 mol) distilled water, and 0.34 mL 28% NH₃(aq). To this clear, colorless inverse micelle reaction solution, 2.0 mL (8.48 mmol) VO(OiPr)₃ was added drop wise yielding an orange liquid phase with a small amount of red precipitate. This reaction solution was stirred overnight. An orange-red precipitate was collected from the turbid reaction solution with centrifugation, and the resulting precipitate was subsequently washed five times with ca. 15.0 mL diethyl ether (Et₂O). This procedure yielded 1.0458 g V$_x$O$_y$ nanocomposite 1a as a dry, orange-red powder.

A 0.1080 g sample of nanocomposite 1a was placed in a ceramic boat, inserted into a quartz tube furnace that was evacuated and back-filled with Ar gas three times. The temperature inside the tube furnace was ramped at 25° C./min to 600° C. under a flow of Ar(g). The sample was held at 600° C. for 1 h under a flow of Ar(g) and subsequently cooled to room temperature under a flow of Ar(g). This procedure yielded 0.0665 g $V_2O_3/VO_2$ nanocomposite 1b as a dry, black powder.

Example 2

Processing Mode 1—Preparation of $V_xO_y$ Nanoparticles by the Inverse Micelle Reaction of VO(OiPr)$_3$ using $2.5 \times 10^{-6}$ mol NH$_3$(aq) catalyst [NH$_3$:V mole ratio=$6 \times 10^{-4}$]. An inverse micelle reaction solution was prepared by adding the following reagents to a 50 mL round-bottom flask with stirring; 15.0 mL (0.14 mol) cyclohexane, 0.60 mL (4.78 mmol) n-hexanol, 1.9 mL (3.25 mmol) Igepal® CO630, 0.70 mL (0.04 mol) distilled water, and 0.17 mL 0.0148 M NH$_3$(aq). To this clear, colorless inverse micelle reaction solution, 1.0 mL (4.24 mmol) VO(OiPr)$_3$ was added drop wise yielding a red liquid phase with a small amount of red precipitate. This reaction solution was stirred overnight, during which time the color of the reaction solution changed from red to green. A green precipitate was collected with centrifugation from the turbid reaction solution and was subsequently washed five times with ca. 15.0 mL Et$_2$O. This procedure yielded 0.3930 g $V_xO_y$ nanocomposite 2a as a dry, green powder.

A 0.1080 g sample of nanocomposite 2a was placed in a ceramic boat, inserted into a quartz tube furnace that was evacuated and back-filled with Ar gas three times. The temperature inside the tube furnace was ramped at 25° C./min to 600° C. under a flow of Ar(g)' The sample was held at 600° C. for 1 h under a flow of Ar(g) and subsequently cooled to room temperature under a flow of Ar(g)' This procedure yielded 0.0282 g $V_2O_5/VO_2$ nanocomposite 2b as a dry, brown powder.

Example 3

Processing Mode 1—Preparation of $V_xO_y$ Nanoparticles by the Inverse Micelle Reaction of VO(OiPr)$_3$ using $4.8 \times 10^{-6}$ mol NH$_3$(aq) catalyst [NH$_3$:V mole ratio=$1 \times 10^{-3}$]. An inverse micelle reaction solution was prepared by adding the following reagents to a 50 mL round-bottom flask with stirring: 15.0 mL (0.14 mol) cyclohexane, 0.60 mL (4.78 mmol) n-hexanol, 1.9 mL (3.25 mmol) Igepal® C0630, 0.70 mL (0.04 mol) distilled water, and 0.33 mL 0.0148 M NH$_3$(aq). To this clear, colorless inverse micelle reaction solution, 1.0 mL (4.24 mmol) VO(OiPr)3 was added drop wise yielding a red viscous reaction solution. This reaction solution was stirred overnight, during which time the color of the reaction solution changed from green to red. A green precipitate was collected with centrifugation and subsequently washed five times with ca. 15.0 mL EtO. This procedure yielded 0.4767 g $V_xO_y$ nanocomposite 3a as a dry, green powder.

A 0.0720 g sample of nanocomposite 3a was placed in a ceramic boat, inserted into a quartz tube furnace that was evacuated and back-filled with Ar gas three times. The temperature inside the tube furnace was ramped at 25° C./min to 600° C. under a flow of Ar(g)' The sample was held at 600° C. for 1 h under a flow of Ar(g) and subsequently cooled to room temperature under a flow of Ar(g)' This procedure yielded 0.0282 g $V_2O_5/VO_2$ nanocomposite 3b as a dry, green powder.

Example 4

Processing Mode 2—Preparation of $V_xO_y$ Nanoparticles by the Inverse Micelle Reaction of VO(OiPr)$_3$ and Oleic Acid using $1.0 \times 10^{-2}$ mol NH$_3$(aq) catalyst [NH$_3$:V mole ratio=6.5]. Inside a nitrogen glove box, a 10 mL two-neck round-bottom flask was fitted with a rubber septum and a gas inlet. A 0.36 mL (1.53 mmol) portion of VO(OiPr)$_3$ was added to the flask. The flask was removed from the glove box and placed on a N$_2$(g) line. A 1.5 mL (3.62 mmol) portion of oleic acid was syringed into the flask under a flow of N$_2$(g) generating a clear, yellow-orange premix solution. Excess isopropanol was removed in vacuo. The prepared premix solution was used immediately and without further purification in the following experiment.

An inverse micelle reaction solution was prepared by adding the following reagents to a 100 mL round-bottom flask with stirring; 30.0 mL (0.28 mol) cyclohexane, 1.2 mL (9.56 mmol) n-hexanol, 3.8 mL (5.92 mmol) Igepal® C0630, 1.4 mL (0.08 mol) distilled water, and 0.68 mL 28% NH$_3$(aq). The premix solution prepared above was drop wise added to the clear, colorless inverse micelle reaction solution generating a clear, red-orange solution. After 15 min of stirring the reaction solution became turbid, and it was stirred overnight. During this time the color of the reaction solution changed from red-orange to green. A 30 mL portion of ethanol (EtOH) was added to the turbid reaction solution to precipitate a dark green product. The product was collected with centrifugation and subsequently washed five times with ca. 15.0 mL EtOH and two times with ca. 15.0 mL EtO. This procedure yielded 0.0479 g $V_xO_y$ nanocomposite 4a as a dry, dark green powder.

A 0.0411 g sample of nanocomposite 4a was placed in a ceramic boat and inserted into a quartz tube furnace. The temperature inside the tube furnace was ramped at 25° C./min to 600° C. under a flow of H$_2$(g). The sample was reduced at 600° C. for 1 h under a flow of H$_2$(g) and subsequently cooled to room temperature under a flow of N$_2$(g). This procedure yielded 0.0020 g VO$_2$ nanocomposite 4b as a dry, black powder.

Example 5

Processing Mode 2—Preparation of $V_xO_y$ Nanoparticles by the Inverse Micelle Reaction of VO(OiPr)$_3$ and Oleic Acid using $2.5 \times 10^{-3}$ mol NH$_3$(aq) catalyst [NH$_3$:V mole ratio=3.3]. Inside a nitrogen glove box, a 10 mL two-neck round-bottom flask was fitted with a rubber septum and a gas inlet. A 0.18 mL (0.76 mmol) portion of VO(OiPr)$_3$ was added to the flask. The flask was removed from the glove box and placed on a N$_2$(g) line. A 0.75 mL (2.36 mmol) portion of oleic acid was syringed into the flask under a flow of N$_2$(g) generating a clear, yellow-orange premix solution. Excess isopropanol was removed in vacuo. The prepared premix solution was used immediately and without further purification in the following experiment.

An inverse micelle reaction solution was prepared by adding the following reagents to a 50 mL round-bottom flask with stirring: 15.0 mL (0.14 mol) cyclohexane, 0.60 mL (4.78 mmol) n-hexanol, 1.90 mL (3.25 mmol) Igepal® CO-630, 0.70 mL (0.08 mol) distilled water, and 0.17 mL 28% NH$_3$ (aq). The premix solution prepared above was drop wise added to the clear, colorless inverse micelle reaction solution causing a clear, orange-red solution. After 1 hour stirring the reaction solution became turbid, and it was stirred overnight. A 15 mL portion of EtOH was added to the turbid reaction solution to precipitate a brown-red product. The resulting precipitate was collected with centrifugation and subsequently washed five times with ca. 15.0 mL EtOH and two times with ca. 15.0 mL Et$_2$O. This procedure yielded 0.0455 g VxOy nanocomposite 5a as a dry, rust-colored powder.

A 0.0443 g sample of nanocomposite 5a was placed in a ceramic boat and inserted into a quartz tube furnace. The temperature inside the tube furnace was ramped at 25° C./min to 600° C. under a flow of H$_2$(g). The sample was reduced at 600° C. for 1 h under a flow of $H_2(g)$ and cooled to room temperature under a flow of $N_2(g)$. This procedure yielded 0.0317 g $VO_2$ nanocomposite 5b as a dry, black powder.

Example 6

Processing Mode 2—Preparation of $V_xO_y$ Nanoparticles by the Inverse Micelle Reaction of $VO(OiPr)_3$ and Oleic Acid using $1.3 \times 10^{-3}$ mol $NH_3(aq)$ catalyst [$NH_3$:V mole ratio=1.7]. Inside a nitrogen glove box, a 10 mL two-neck round-bottom flask was fitted with a rubber septum and a gas inlet. A 0.18 mL (0.76 mmol) portion of $VO(OiPr)_3$ was added to the flask. The flask was removed from the glove box and placed on a $N_2(g)$ line. A 0.75 mL (2.36 mmol) portion of oleic acid was syringed into the flask under $N_2(g)$ flow generating a clear, yellow-orange premix solution. Excess isopropanol was removed in vacuo. The prepared premix solution was used immediately and without further purification In the following experiment.

An inverse micelle reaction solution was prepared by adding the following reagents to a 50 mL round-bottom flask with stirring; 15.0 mL (0.14 mol) cyclohexane, 0.60 mL (4.78 mmol) n-hexanol, 1.90 mL (3.25 mmol) Igepal® C0630, 0.70 mL (0.08 mol) distilled water, and 0.09 mL 28% $NH_3(aq)$. The premix solution prepared above was drop wise added to the clear, colorless inverse micelle reaction solution generating a clear, green solution. After 4 h of stirring, the reaction solution became turbid, and it was stirred overnight. During this time, the color of the reaction solution changed from green to yellow. A 15 mL portion of EtOH was added to the reaction solution to precipitate a yellow product. The product was collected with centrifugation and subsequently washed five times with ca. 15.0 mL EtOH and two times with ca. 15.0 mL $Et_2O$. This procedure yielded 0.0575 g $V_xO_y$ nanocomposite 6a as a dry, yellow powder.

A 0.0557 g sample of nanocomposite 6a was placed in a ceramic boat and inserted into a quartz tube furnace. The temperature inside the tube furnace was ramped at 25° C./min to 600° C. under a flow of $H_2(g)$. The sample was reduced at 600° C. for 1 h under a flow of $H_2(g)$ and cooled to room temperature under a flow of $N_2(g)$. This procedure yielded 0.0350 g $VO_2/V_2O_3$ nanocomposite 6b as a dry, blue-black powder.

Example 7

Processing Mode 3—Preparation of $V_xO_y$ Nanoparticles by the Inverse Micelle Reaction of $VO(OiPr)_3$ and Acetic Acid and $NH_3(ag)$ catalyst [$NH_3$:V mole ratio=3.3]. Inside a nitrogen glove box, a 10 mL two-neck round-bottom flask was fitted with a rubber septum and a gas inlet. A 1.2 mL (5.09 mmol) portion of VO(OiPr)3 was added to the flask. The flask was removed from the glove box and placed on a $N_2(g)$ line. A 0.95 mL portion of glacial acetic acid was syringed into the flask under $N_2(g)$ flow generating a clear, red-orange premix solution. The prepared premix solution was used immediately and without further purification in the following experiment.

An inverse micelle reaction solution was prepared by adding the following reagents to a 250 mL round-bottom flask with stirring; 100.0 mL (0.93 mol) cyclohexane, 2.4 mL (19.12 mmol) n-hexanol, 12.65 mL (21.62 mmol) Igepal® CO-630, 4.65 mL (0.26 mol) distilled water, and 1.15 mL 28% $NH_3(aq)$. The above prepared premix solution was drop wise added to the clear, colorless inverse micelle reaction solution generating a clear, red-orange solution. The reaction solution was stirred overnight, during which time it became turbid. A 50 mL portion of EtOH was added to the turbid reaction to precipitate a red-orange product. The product was collected with centrifugation and subsequently washed five times with ca. 15.0 mL EtOH and two times with ca. 15.0 mL $Et_2O$. This procedure yielded 0.5025 g $V_xO_y$ nanocomposite 7a as a dry, red-orange powder.

A 0.0055 g sample of nanocomposite 7a was dispersed in ca. 3 mL acetone and sonicated for 30 min. The sample solution was added drop wise to a silicon wafer, and the acetone was allowed to evaporate. The silicon wafer/sample was inserted into a quartz tube furnace, and the temperature inside the tube furnace was ramped at 25° C./min to 500° C. under a flow of $N_2(g)$. The sample was heated under a flow of 10% $H_2$/90% $N_2(g)$ at 500° C. for 15 min, and the sample was subsequently cooled to room temperature under a flow of $N_2(g)$. The resulting product was collected by gently scraping the silicon wafer with a plastic spatula. This procedure yielded 0.0022 g $VO_2$ nanocomposite 7b as a dry, black powder.

Alternatively, the $VO_2$ nanoparticles may be synthesized by reacting a vanadyl ester having the formula $VO(OR)_3$ (wherein R is an alkyl, preferably a lower alkyl, group) with a carboxylic acid, e.g., a hydroxycarboxylic acid, in an aqueous medium, followed by precipitation therefrom of nanosize $VO_2$ particles utilizing a precipitating organic solvent such as acetone, for example.

Example 8

A 250-mL flask was charged with 5.0 mL vanadium (V) triisopropoxide oxide and 5.0 g citric acid followed by the addition of 90.0 mL deionized water while sonicating. Upon addition of water, the solution was orange in color with a deep red precipitate. After 90 minutes of sonication, the precipitate was no longer observed and the solution remained orange. The solution was allowed to age for 48 hours. After 24 hours, the solution was green in color with no turbidity. The final solution color was blue with no turbidity after 48 hours and remained that color.

After the 48 hour aging process, two synthetic strategies can be taken. Strategy A produces particles smaller than 50 nm and strategy B produces larger particles. A rough size selection can be performed to narrow the size range of strategy B.

Strategy A: The aging process was followed by the addition of copious amounts of acetone (10:1) and centrifugation to yield amorphous nanoparticles. These particles were washed twice more with acetone and then cast onto silicon wafers using a solvent mixture of 3:1 isopropanol to water. The wafers are then placed into a tube furnace and annealed as described below to yield a range of crystalline vanadium oxides.

Strategy B: A 10.0 mL aliquot of the solution containing the aged particles were added to a solution of 400.0 mL water, 2.0 mL ammonia, and 5.0 mL isopropanol and aged for an additional 72 hours. After aging, the particles were removed from solution with the addition acetone (10 mL for every milliliter of particle solution) and centrifugation to yield large amorphous particles. An increase in size while keeping the spherical morphology is observed in the TEM micrograph labeled Figure 3. These particles were washed with acetone, cast onto silicon wafer wafers using a solvent mixture of 3:1 isopropanol to water, and annealed as described below.

The temperature conditions for the production of VO2 were maintained in a tube furnace as follows: ramp of 50° C./min to 400° C., hold at 400° C. for 30 min, ramp of 50° C./min to 650° C., hold at 650° C. for 30 min, and cool to room temperature. Annealing conditions are preferably optimized with each batch of amorphous vanadium oxide nanoparticles for the production of V02. The following annealing conditions were consistently performed under nitrogen: initial ramp of 50° C./min to 400° C., held at 400° C. for 30 min, ramp of 50° C./min to 650° C., and cool to room temperature. The variable that had to be optimized for each batch for V02 is the amount of time the sample is exposed to getter gas. The range of time the sample is exposed to getter gas is between 5 and 30 minutes while the temperature is being held at 650° C.

Example 9

Fabrication of VOz nanoparticle thin-film samples for electric resistance measurements. V02 nanoparticles were dispersed in acetone at the concentration of about 1 mglmL using low-power sonication for 10 min. The dispersion was cast onto a multi-finger, interdigitated array (IDA) constructed of five parallel platinum metal lines (15 μm both digit width and interdigit spacing) printed on a glass substrate.

The sample was dried in air at room temperature for 12 h before measurement. For temperature programmed electric resistance measurements, samples were placed into an oven where the temperature was controlled between 20° C. and 90° C. Temperature and electric resistance measurements were recorded simultaneously using a Fluke 51 K/J thermocouple and a Fluka True RMS Multimeter, respectively.

$VO_2$ nanoparticles were prepared by an inverse-micelle sol-gel synthesis strategy using $VO(OiPr)_3$ as metal alkoxide and Igepal® CO-630 as surfactant. Surfactant/water concentrations and molar ratio were chosen to provide water vesicles of a size suitable for forming gel nanoparticles. To control the rate of $VO(Oi-Pr)_3$ hydrolysis and achieve $V_xO_y$ gel nanoparticle formation, three different sol-gel synthesis strategies were investigated (Modes 1-3), as described in Table 1. In addition, three different thermal annealing procedures were explored to transform pre-formed $V_xO_y$ gel products into crystalline $VO_2$ nanoparticles.

TABLE 1

Synthesis Conditions for Inverse Micelle Sol-Gel Preparations of $V_xO_y$ Xerogels

| No. | $NH_3$ (mmol) | $VO(OiPr)_3$ (mmol) | Acid (mmol) | $C_6H_{12}$ (mL) | n-hexanol (mL) | Igepal (mL) | Water (mL) |
|---|---|---|---|---|---|---|---|
| Mode 1: No Pre-mix | | | | | | | |
| 1a | 2.5 | 8.48 | — | 30 | 1.2 | 3.8 | 1.4 |
| 2a | 0.0025 | 4.24 | — | 15 | 0.6 | 1.9 | 0.7 |
| 3a | 0.0048 | 4.25 | — | 15 | 0.6 | 1.9 | 0.7 |
| Mode 2: Pre-mix of $VO(Oi-Pr)_3$ with oleic acid | | | | | | | |
| 4a | 10 | 1.53 | 3.62 | 30 | 1.2 | 3.8 | 1.4 |
| 5a | 2.5 | 0.76 | 2.36 | 15 | 0.6 | 1.9 | 0.7 |
| 6a | 1.3 | 0.76 | 2.36 | 15 | 0.6 | 1.9 | 0.7 |
| Mode 3: Pre-mix of $VO(Oi-Pr)_3$ with acetic acid | | | | | | | |
| 7a | 17 | 5.09 | 16.5 | 100 | 2.4 | 12.65 | 4.65 |

$VO(Oi-Pr)3$ undergoes rapid hydrolysis in aqueous vesicles containing a wide range of $NH_3$ concentrations [V:$NH_3$ mole ratio=3 (1a), 1700 (2a), or 885 (3a)] producing immediate precipitation of a red gel (Mode 1). Thermal annealing of gels, 1a-3a, at 600° C. under Ar gives the corresponding crystalline powders 1b-3b. TEM micrographs of 1b-3b reveal highly sintered agglomerates consistent with either partial or total breakdown of micellular confinement during sol-gel processing (see Supporting Information). XRD scans of 1b-3b reveal that 1b is a mixture of $V_2O_3$ and $VO_2$ while products 2b and 3b are mixtures of $V_2O_5$ and $VO_2$ Only minor amounts of $VO_2$ are present in any of these products. Product 1b, prepared under the most basic conditions, represents the greatest extent of metal-ion reduction.

To kinetically retard $VO(Oi-Pr)_3$ hydrolysis, a yellow-orange modified vanadium alkoxide precursor was prepared by reacting neat $VO(Oi-Pr)_3$ with neat oleic acid in a 1:2.3 molar ratio. Addition of this liquid pre-mix to aqueous inverse micelles containing three different concentrations of $NH_3$ [V:$NH_3$ mole ratio=0.15 (4a), 0.30 (Sa), or 0.60 (6a)] affords more well-controlled sol-gel conversion (Mode 2). Turbidity is observed during 0.25-4 h of reaction with the lowest $NH_3$ concentration (6a) giving the slowest onset to turbidity formation. Thermal annealing gels 4a-6a at 600° C. under Hz for 60 min gives the corresponding crystalline powders, 4b-6b. While TEM micrographs of products 4b and 5b reveal large agglomerates and poor particle resolution, TEM micrographs of gel 6a and the corresponding annealed powder, 6b, show predominately nanoparticulate aggregates with some inter-particle ripening/sintering. Gel particles of less than 100 nm in diameter are observed, although considerable inter-particle necking is evident. However, an acceptable degree of micellular confinement has apparently been achieved during sol-gel processing. Some of the 6b product nanocrystals show edges and faces. XRD scans of 4b-6b reveal mixtures of $VO_2$ and variable relative amounts of $V_2O_3$.

These results suggest that the presence of oleic acid destabilizes inverse micelle vesicles during sol-gel processing facilitating Ostwald ripening, and that thermal treatment under $H_2$ gas leads to over-reduction of vanadium ion. To minimize such problems, a pre-mix solution of neat $VO(Oi-Pr)_3$ and glacial acetic acid (in a 1:3.2 molar ratio) was hydrolyzed within basic aqueous inverse micelles [V:$NH_3$ mole ratio=0.30 (7a)] giving turbidity over 12-24 h of reaction (Mode 3). When the resulting $V_xO_y$ gel, 7a, is dispersed onto a Si wafer and heated at 500° C. under getter gas (10% H2/90% N2) for 15 min, an annealed solid, 7b, is formed and can be isolated as a black powder. TEM micrographs of 7a and 7b reveal nearly spherical nanoparticles for both the gel and the annealed powders. The average diameter of the annealed particles is 24±8 nm. An XRD scan of 7b indicates predominant formation of $VO_2$ along with a small amount of $V_2O_3$. A volume-weighted average particle diameter calculated from XRD peak widths using Scherrer's equation is 32±8 nm. On-particle EDS spectra of 7b show the characteristic Kα and Kβ emission lines characteristic of vanadium. When the synthesis of 7b is repeated using one-third of the amount of water shown in Table 1, the resulting $VO_2$ nanoparticles, 7b', have an average diameter of 70±9 nm.

STM switching behavior of nanopowders 7b and 7b' has been confirmed by electrical resistance measurements. $VO_2$ nanoparticles 7b or 7b' can be suspended in acetone via sonication and then dispersed as thin layers onto the surface of a Pt IDA micro-electrode. Electrical resistance measurements were recorded successfully for each sample as a function of temperature. A commercial sample of $VO_2$ powder (Aldrich, 99.9%) served as a control sample.

Upon heating, electrical resistance rises abruptly near the known bulk transition temperature of 68° C. and then decreases, as expected for a STM phase transition. Upon cooling, resistance increases slowly, giving phase transition reversal at ca. 56° C. The hysteresis loop for $VO_2$ nanoparticles 7b' (average diameter=70±9 nm; plot B) shows a slight rise near 66° C. followed by a rapid decrease in resistance. Inflection points are evident near ca. 68° C. on the heating cycle and at ca. 57.5° C. on the cooling cycle. For $VO_2$ nanoparticles of smallest size 7b (average diameter=24±8 om; plot C), corresponding inflection points occur at ca. 68.5° C. and at ca. 57.5° C. A distinct rise in resistance near the onset of the STM phase change is not evident for this sample, though rapid decrease in resistance does occur near 68° C. as expected.

Although the mechanism of electrical current flow during STM phase transitions has not been adequately modeled for nanoparticulate samples, the close correspondence between these three experimental hysteresis loops provides strong evidence that STM switching has been confirmed for samples 7b and 7b'.

Sol-gel processing of VO(Oi-Pr)$_3$ within basic aqueous vesicles of an inverse micelle occurs rapidly; however, premixing or modifying VO(Oi-Pr)$_3$ with acids such as glacial acetic acid or oleic acid, for example, generates a modified metal alkoxide intermediate that undergoes sol-gel conversion over several hours. VxOy gel nanoparticles can be isolated free of the inverse micelle component and thermally annealed as dispersions on a Si wafer to afford nearly spherical VO$_2$ nanoparticles having good compositional purity. By controlling vesicle size, gel particles of different average particle sizes (e.g., 24±8 nm or 70±9 nm, for example) can be prepared. VO$_2$ nanoparticles prepared by this method undergo a hysteretic semiconductor-to-metal phase transition near 68° C., as expected for crystalline VO$_2$. Successful formation of crystalline VO$_2$ nanoparticles without stabilization as a thin film or by a solid matrix provides a unique opportunity for direct incorporation of this "smart" material into a variety of host materials.

It will be understood by those skilled in the art that the above-described methods may also be utilized to prepare other oxides of vanadium such as V$_2$O$_3$, V$_2$O$_5$ and the like.

Example 10

Preparation of Unsupported V2O3 Nanoparticles by the Inverse Micelle Sol-Gel Processing of VO(OiPr)3 and Acetic Acid.

Inside a nitrogen glove box, a 10 mL two-neck round-bottom flask was assembled with a rubber septum and a gas inlet. A 1.2 mL (5.09 mmol) portion of VO(OiPr)3 was added to the flask. The flask was removed from the glove box and placed on a N2(g) line. A 0.95 mL portion of glacial acetic acid was syringed into the flask under N2(g) flow generating a clear, red-orange premix solution. The prepared VO(OiPr)3/acetic acid premix solution was used immediately and without further purification in the following experiment.

An inverse micelle reaction solution was prepared by adding the following reagents to a 250 mL round bottom flask with stirring; 100.0 mL (0.93 mol) cyclohexane, 2.4 mL (19.12 mmol) n-hexanol, 12.65 mL (21.62 mmol) Igepal® CO-630, 4.65 mL (0.26 mol) distilled water, and 1.15 mL 28% NH3(aq). The above prepared VO(OiPr)/3acetic acid premix solution was drop wise added to the clear, colorless inverse micelle reaction solution generating a clear, red-orange solution. The reaction solution was stirred overnight. A 50 mL portion of EtOH was added to the resulting turbid reaction solution to precipitate a red-orange product.

The product was collected with centrifugation and subsequently washed five times with ca. 15.0 mL EtOH and two times with ca. 15.0 mL Et2O. This procedure yielded 0.5025 g VxOy nanopowder 8a as a dry, red-orange powder.

A 0.0181 g sample of VxOy nanopowder 8a was dispersed in ca. 3 mL acetone and sonicated for 30 min. The sample solution was added drop wise to a silicon wafer, and the acetone was allowed to evaporate. The silicon wafer/sample was inserted into a quartz tube furnace, and the temperature inside the tube furnace was ramped at 25° C./min to 600° C. under a flow of H2(g). The sample was reduced at 600° C. for 1 h under a flow of H2(g) and subsequently cooled to room temperature under a flow of N2(g). Upon cooling, the silicon wafer was gently scraped with a plastic spatula to collect the product powder. This procedure yielded 0.0068 g V2O3 nanopowder 8b as a dry, black powder.

A TEM micrograph, XRD scan and EDS spectrum of nanopowder 8b show nanoparticles of nearly spherical shape having an average diameter of 35±10 nm. An XRD scan of 8b indicates formation of highly pure crystalline V2O3. A volume-weighted average particle diameter calculated from XRD peak widths using Scherrer's equation is 22±3 nm. On-particle EDS spectra of 8b show the characteristic Kα emission line of vanadium.

The invention claimed is:

1. A method for preparing vanadium oxide nanoparticles comprising reacting a vanadyl ester having the formula VO(OR)$_3$, wherein R is an alkyl group with a carboxylic acid in an aqueous medium, followed by precipitation therefrom of nanosize vanadium oxide particles.

2. The method of claim 1 wherein said vanadium oxide is includes VO$_2$.

3. The method of claim 1 wherein said vanadium oxide includes V$_2$O$_3$.

4. The method of claim 1 wherein said vanadium oxide includes V$_2$O$_5$.

* * * * *